Figure 1:
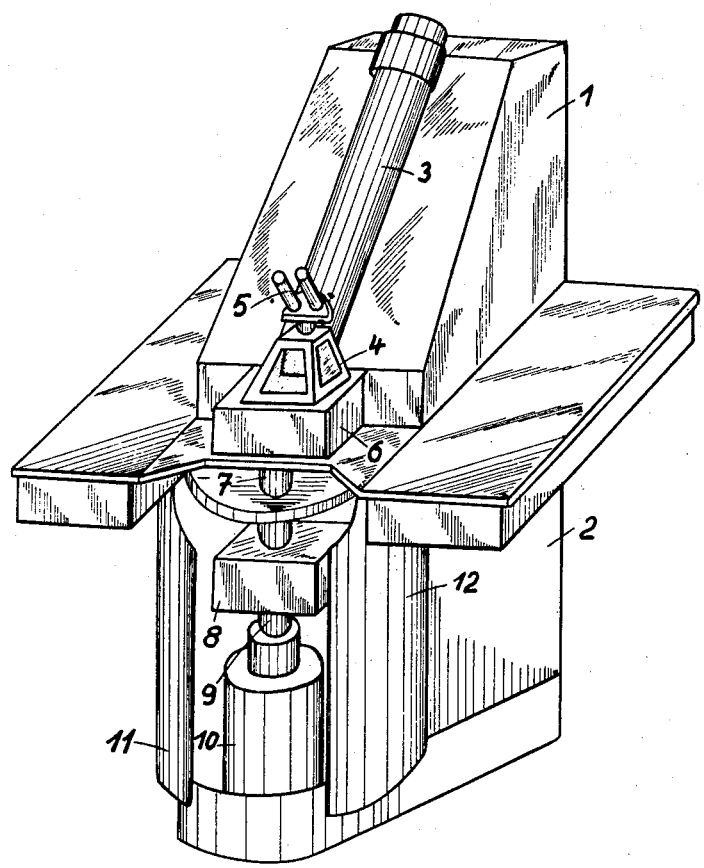

United States Patent Office 2,921,200
Patented Jan. 12, 1960

2,921,200

ARRANGEMENT FOR DETACHABLE CONNECTION OF A VACUUM PUMP TO A VACUUM VESSEL

Heinrich Sonnberger, Heidenheim, Germany, assignor to Carl Zeiss, Heidenheim, Germany Application September 16, 1957, Serial No. 686,807

Claims priority, application Germany September 15, 1956

2 Claims. (Cl. 250—49.5)

It is an object of the present invention to provide an arrangement for detachable connecting a vacuum pump to a vacuum vessel whereby this connection is reliable throughout long periods of time and is easily operable. This arrangement is so constructed that it also takes over the functions of a high-vacuum valve, which is necessary in such arrangements of prior art.

It is of prior art to connect a vacuum vessel, particularly an electron microscope to a vacuum pump via a flexible metal hose, wherein this hose is on the one side attached to the vacuum vessel and on the other side to a chamber arranged before the vacuum pump. This chamber arranged before the vacuum pump contains a high-vacuum valve which is shut when the electron microscope is in communication with the atmosphere, in order to render possible a vacuum-tight separation of the pump from the vacuum vessel. This arrangement of prior art has the disadvantage that by the vibrations of the vacuum pump and by corrosion the flexible metal connecting hose is eventually rendered so unsafe that irruptions of air result.

It is a principal object of my invention to provide an arrangement which avoids these disadvantages and permits furthermore a less expensive connection of a vacuum pump to a vacuum vessel and the elimination of an additional high-vacuum valve. According to the invention in an arrangement for the detachable connection of a vacuum pump to a vacuum vessel there is provided an aperture in said vacuum vessel in which a first gasket ring is arranged, a first chamber arranged before the vacuum pump and connected to it vacuum-tight, said chamber containing one free aperture in which a second gasket ring is arranged, a second chamber arranged within said first chamber and provided with a single aperture in which a third gasket ring is arranged, and a tube slidably arranged within said gasket rings, said tube being axially displaceable from a position in which the vacuum vessel is in communication with the vacuum pump, whereby said tube is supported within said first and said second gasket ring to a position in which the vacuum pump is sealed off and the vacuum vessel is released, whereby said tube is supported within said second and said third gasket ring. So-called lip-gaskets are with advantage used for these gasket rings.

When the axially movable tube is supported within said first and said second gasket ring a flexible connection of the vacuum vessel to the vacuum pump is ensured wherein the tube can move about two points which correspond at any time to the points where the axis of the tube pierces the planes of the gasket rings. If an oil diffusion pump is used the gasket material (mostly rubber) insulates the vacuum vessel from the small vibrations of the pump which occur during the boiling process of the liquid in this pump. When said movable tube is axially displaced so that it is supported within said second and said third gasket ring the lower end of the tube is closed vacuum-tight so that no air can penetrate into the vacuum pump when the vacuum vessel is placed in communication with the atmosphere. In this way an oxidation of the oil in said oil diffusion pump, which would render this oil unusable is avoided.

In electron microscopes particularly it is important to separate the vacuum vessel proper from the vacuum pump as soon as an irruption of air into the vacuum vessel takes place. It is, therefore, a still further object of my invention to provide means for automatically moving said tube in a position in which the vacuum pump is sealed off as soon as the pressure in said vacuum vessel exceeds a predetermined value. In said position the tube is supported within all of said gasket rings.

Figure 3:
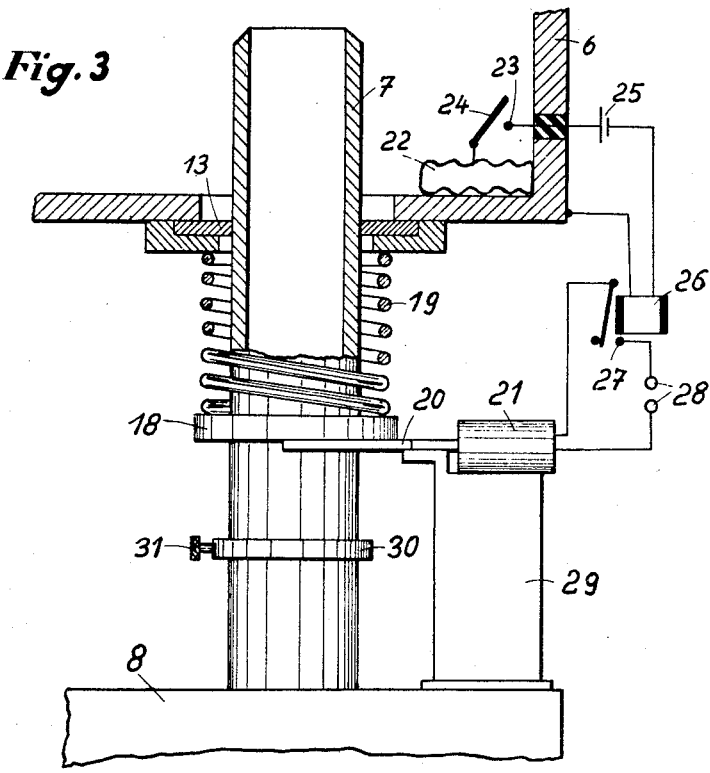
Figure 4:
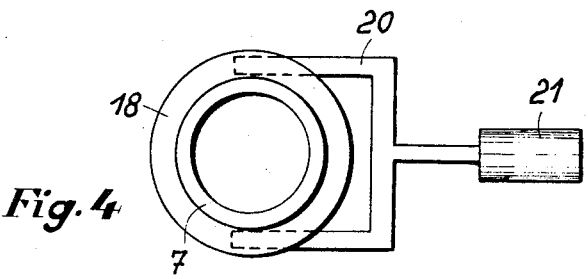

The object and advantages of the present invention will be more readily understood by reference to the accompanying drawings taken in connection with the following specification, wherein like numerals refer to like parts throughout. In the drawings Fig. 1 is a schematic representation of an electron microscope in which the arrangement of the invention is employed, Fig. 2 is a representation of the releasable tube and the required gaskets and chambers, sectional view, Fig. 3 is an embodiment of the invention in which the releasable tube is automatically moved axially as soon as air penetrates into the vacuum vessel, partly sectional view, and Fig. 4 is a separate representation of the mechanism for molding the releasable tube in operating position.

In Fig. 1 an electron microscope is shown schematically which consists of an upper part 1 and a lower part 2. In the upper part 1 all parts required for operating the microscope have been housed while the lower part 2 houses the necessary vacuum pump and the high-voltage apparatus. A tube in which the radiation source and all electron-optical elements are arranged is designated with 3. The electron rays emerging from tube 3 enter a chamber 4 on the base of which a luminous screen is arranged. The resulting luminous screen image can be observed through the side windows of chamber 4. On the upper side of chamber 4 an optical microscope 5 is set up which serves for observing the luminous screen image on an enlarged scale. A chamber 6 serves for housing photo-plates for recording the luminous screen image. The parts 3, 4 and 6 are under high-vacuum and are connected with a high-vacuum pump 10 by means of an axially movable tube 7, a chamber 8 and another tube 9. In Fig. 1 the doors 11 and 12 are shown open, but they are closed when operating the electron microscope.

Figure 2:
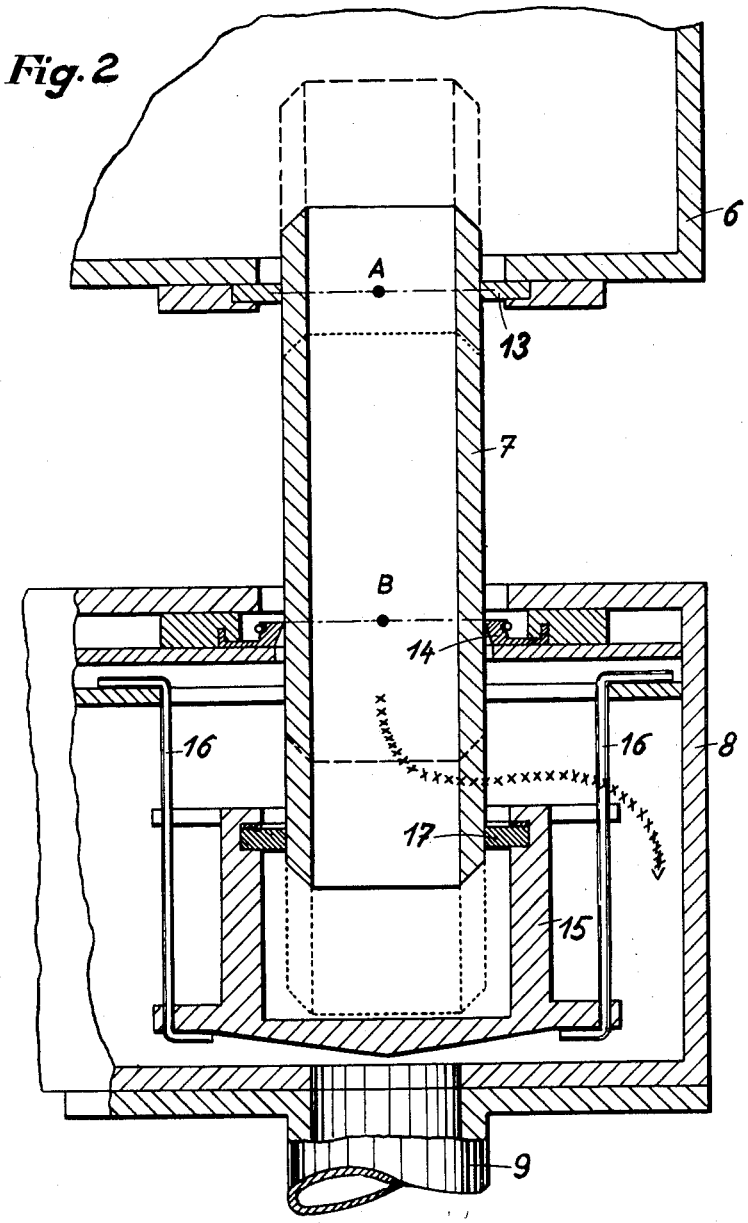

In Fig. 2 the parts 6, 7, 8 and 9 are shown in cross-sectional view. The vessel 6 standing under high-vacuum is fitted with a gasket ring 13 within which the axially movable tube 7 rests. The tube 7 projects into a chamber 8 which is connected with the intake stack of a vacuum pump 10 by means of a tube 9. Also in chamber 8 a gasket ring 14 is arranged. Chamber 8 further contains a chamber 15 which is flexibly suspended by steel wires 16. The single aperture of this second chamber 15 is fitted with a gasket ring 17. This gasket ring serves for vacuum-tight closing of chamber 15 when tube 7 is introduced.

In the case represented in Fig. 2 the axially movable tube 7 is introduced into the chamber 15 so that the vacuum pump 10 is separated from the vacuum vessel 6. In this position the vacuum vessel 6 may be placed in communication with the atmosphere without any air penetrating into the pump 10.

If the tube 7 is in its upper position, i.e. when it is supported within the gasket rings 13 and 14 as represented in dashed lines its lower end slides out of the gasket ring 17 of the chamber 15. In this position the vacuum vessel 6 is connected to the vacuum pump 10.

The air is then sucked from the tube 7 into the vacuum pump 10 along the path marked by crosses.

If the tube 7 is in its lower position, i.e. when it is supported within the gasket rings 14 and 17 as represented in dotted lines the vacuum vessel 6 is again separated from the vacuum pump 10. Now the vacuum pump 10 together with the antechamber 8 can be drawn off from the vacuum vessel 6.

The gasket rings 13, 14 and 17 are with advantage constructed as lip gaskets as represented in 14.

The inevitable alterations of position and inaccuracies of the vacuum pump 10 e.g. an oil diffusion pump relative to the vessel 6 are taken up by the tube 7 in that it is swingable about the two points A and B. By the arrangement according to the invention a flexible connection between the vacuum vessel 6 and the vacuum pump 10 is attained while the gaskets insulate the vessel 6 from the small vibrations of the oil diffusion pump 10 which occur during the boiling process of the liquid in this pump.

Fig. 3 shows an arrangement for automatically moving tube 7 axially towards chamber 8 when air penetrates into vacuum vessel 6. The axially movable tube 7 is fitted with a ring 18 on which a helical spring 19 rests. A lever 20 serves for holding the tube 7 in the upper position. This lever is movable by means of an electromagnet 21. It can be gathered from Fig. 4 that the lever 20 touches the stop 18 on two sides. The electromagnet 21 is situated on the carrier 29 which also holds lever 20. Tube 7 is further provided with a ring 30 which can be held in any position by means of a screw 31. This ring 30 serves for limiting the downward moving of tube 7.

The vacuum vessel 6 contains a barometric bellow 22 which serves for rotating a contact lever 24. By means of this contact lever 24 a contact 23 can be made. Furthermore a relay 26 is provided which can be energized via a battery 25 and which serves for closing a contact 27.

When an air ingress takes place in the electron microscope the barometric bellow 22 is compressed. As a consequence, the contact lever 24 is turned to the right and closes the contact 23. Now the relay 26 is energized via the battery 25 and closes the contact 27. As a consequence thereof, the electromagnet 21 is energized by the mains 28 so that the lever 20 is turned to the right. As soon as the lever 20 releases ring 18, tube 7 is pressed downwards by spring 19 until ring 30 stops on the upper side of the chamber 8. This position of tube 7 corresponds to the position shown in Fig. 2 with unbroken lines. As described there, the vacuum pump 10 is separated from the vacuum vessel 6 in this position.

An ionization vacuum gauge or a corresponding electric bridge circuit for controlling relay 26 can also be used instead of the barometric bellow 22.

The device according to the invention is not limited to the described application in the case of electron microscopes, but can also serve for connecting every vacuum vessel with a vacuum pump.

I claim:

1. An arrangement for detachable connecting a vacuum pump to a vacuum vessel which contains an aperture fitted with a first gasket ring comprising a first chamber arranged between said vacuum vessel and said vacuum pump and fixedly connected vacuum-tight to the intake stack of said vacuum pump, said chamber containing an aperture opposing said aperture of the vacuum vessel and fitted with a second gasket ring, a second chamber flexibly suspended by steel wires inside said first chamber and containing only one aperture which is in alignment with said aperture of the first chamber and is fitted with a third gasket ring, a tube movable in its axial direction and slidably supported vacuum-tight within said gasket rings, said tube being extended in its axial direction so that it can be supported within all of said gasket rings in which position the vacuum pump is sealed off and is only mechanically connected to said vacuum vessel, said second chamber being extended in the axial direction of said tube so that this tube can move axially out of said first gasket ring, and means for axially moving said tube from a position in which said vacuum vessel is in communication with said vacuum pump, whereby said tube is supported within said first and said second gasket ring to said other two positions.

2. The arrangement of claim 1 said means for axially moving said tube consisting of a spring acting on said movable tube and tending to move it in that position in which said vacuum pump is sealed off, a lever serving for holding said tube in that position in which said vacuum vessel is in communication with said vacuum pump, an electromagnet serving for moving said lever out of contact with said tube when being energized, a barometric bellow arranged within said vacuum vessel, a switch coupled to said barometric bellow in such a manner that it is closed as soon as the pressure within the vacuum vessel rises, and a source of current coupled to said electromagnet via said switch in such a manner that said electromagnet is energized when said switch is closed, said electromagnet moving thereby said lever and releasing the axial moving of said tube.

References Cited in the file of this patent

UNITED STATES PATENTS

| | | |
|---|---|---|
| 1,477,722 | Slattery | Dec. 18, 1923 |
| 1,687,317 | Archer | Oct. 9, 1928 |
| 2,479,359 | Holt | Aug. 16, 1949 |
| 2,535,384 | Batt | Dec. 26, 1950 |
| 2,725,891 | De Bourguignon | Dec. 6, 1955 |